[68] Locks.
ABEL JUDSON'S
Gun Lock.
6588 X
Patented JUNE 13 1831
6-13-1831
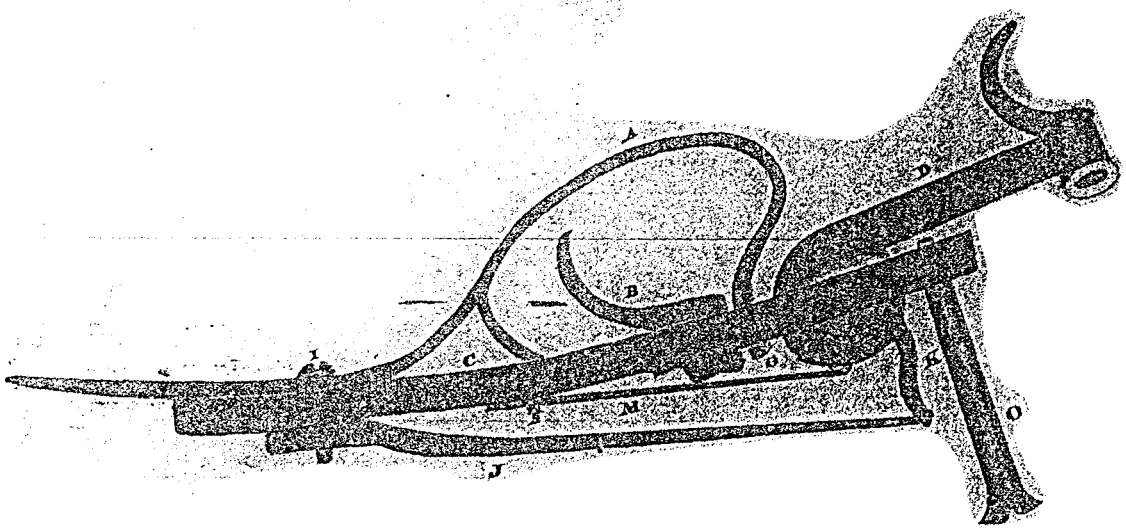
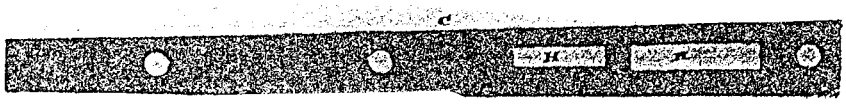
References.
A. Guard. F. Trigger pin. B. Trigger. G. Hook. L. Notch. K. Swivel. C. plate.
H. Appertures. M. Dog or spring. D. Hammer or Cock. I. Screw. N. Screw.
E. Pin or screw. J. Main spring. O. Screw.-

6588X

June 13, 1831

Abel Judson, a Citizen of

Letters Patent.

The Schedule referred to in these Letters Patent and making part of the same, containing a description in the words of the said Abel Judson himself of his improvement in the construction of Gun Locks.

To all to whom these presents shall come.

Be it known, that ~~that~~ I, Abel Judson, of New-Lebanon, County of Columbia, and State of New York, have invented, constructed and applied to use, a new and useful improvement in Gun and Pistol Locks, by which the guard and trigger, are attached to the plate of the locks, and to be applied to the underside of the barrel and stock, and to be used with percussion caps or powder. The following is a full and exact description of the construction, and operation of said lock, as improved by me. 1st The plate of the lock, 5½ inches long, ½ inch wide at the forward end, and ⅜ of an inch wide at the other, 5/16 of an inch thick, through which are made apertures for one end of the guard, and trigger, and for the hammer or cock. The trigger, is connected with and attached to the plate, by a pin passing through the plate, in the direction of its width 1 inch from the forward end of the plate, the cock is attached to the plate, in the same manner as the trigger, by a pin, or screw ¾ of an inch forward of the trigger pin, to the centre of the pin or screw passing through the cock. The Guard at its forward end, is attached to the plate by a hook passing through the aperture forward of the trigger, the other end is attached by a screw, which passes through the plate, 1 inch from the back end and screwing into the mainspring which gives motion to the lock; thus connecting both firmly, with the plate, the mainspring extends from its attachment, and guard 4⅛ inches, at a proper angle from the plate, to give the power necessary to operate on the lock, and is attached to the cock by a swivel or stirrup, in the usual manner of attaching mainsprings to to tumblers in the common London lock. The cock extends the necessary distance forward of the plate, to give the force required. There is a notch in the cock 1/8 of an inch from the plate similar and for the same purpose as those made for the dog, in locks of the old construction. The dog is attached to the plate, 1 1/2 inch from the attachment of the mainspring, between the plate and the main spring, and extends to the centre of the lock so as to operate on the notch in the cock when set, for a discharge. The dog is made in form and tempered, as a spring, except, at the forward end which is left hard where it comes in contact with the cock. Said dog, or spring, is in contact with the trigger, by the pulling of which, it is discharged at pleasure. The whole is attached to the gun, or pistol, by letting the thickness of plate into the stock; and by a screw, passing through the breech pin of the barrel, and through the stock, into the plate of the lock, near the forward end of said plate, and also by a screw or some other convenient attachment to the gun, or pistol, at the back end of the guard, which extends beyond the length of the lock plate; the communication between the lock, and the barrel, is effected in the same manner as in other percussion locks, the end of the cock, which strikes the percussion cap, and the fuse which enters the chamber, at the points of contact, being constructed in the usual manner. The dimensions, given in the above description, may be varied according to the size of the gun, or pistol, for the convenience or taste of the artist.

And what I claim as my invention or improvement is the arrangement of the several parts of the lock, and the uniting and attaching of the same to the same plate, with a guard, and trigger, and also I claim, as my invention and improvements, the twofold operation of the dog, acting both as dog and spring. I also claim as my invention and improvement, the manner of attaching the lock, stock and barrel by one screw, passing through the breech pin of the barrel into the plate of the lock, or through the plate of 6588x June 13, 1831 of the lock, into the breech pin, of the barrel, as may be most convenient.

Witnesses

George G. Bull

Hampton G. Bull

Abel Judson

Exd.

H.G.